April 7, 1942.   H. E. GRAU ET AL   2,278,439
PIPE TONG
Filed May 16, 1939   3 Sheets-Sheet 1

Herbert E. Grau.
Chester A. Lundeen.
INVENTORS.

BY Lyon & Lyon
ATTORNEYS

Patented Apr. 7, 1942

2,278,439

UNITED STATES PATENT OFFICE 2,278,439

PIPE TONG

Herbert E. Grau and Chester A. Lundeen, Vernon, Calif., assignors to Byron Jackson Co., Huntington Park, Calif., a corporation of Delaware Application May 16, 1939, Serial No. 273,909

10 Claims. (Cl. 81—66)

This invention relates generally to pipe tongs, and more particularly to improvements in pipe tongs adapted for use on oil well casing, drill pipe, and the like.

Well pipe tongs must fulfill two exacting requirements in order to perform their function satisfactorily. The first and most important requirement is that they grip the pipe immediately upon being closed, so that no slippage occurs. The other requirement is that they do not crush the pipe. Both slipping of the tongs and crushing of the pipe are avoided if the jaws contact the pipe over a considerable area, uniformly distributed about the pipe.

A type of tong which satisfactorily fulfills the above requirements, and which as a result has come into general use, is that known as the "Wilson" tong. A distinctive feature of this tong is the pivotal mounting of two oppositely disposed series of jaws on the tong handle at points spaced longitudinally of the handle, thereby providing a double compensating fulcrum assuring the application of equalized leverage to the two sets of jaws. Entirely satisfactory performance of these tongs is, however, limited to pipe of a certain size, or to two definite sizes when provided with a double bore and a two-step latch. When used with undersized or oversized pipe or joints there is a tendency for one or the other set of jaws to buckle, preventing proper contact with the pipe and causing the tong to slip on the pipe or to concentrate the pressure at certain small areas, which may result in crushing the pipe.

It has been discovered that the cause of improper contact of the jaws with slightly oversized or undersized pipe or joints may be traced directly to the fact that the two inner jaws are pivotally connected to the handle at different radial distances from the pipe axis and that, as the handle assumes different angularly related positions to increase or decrease the size of the pipe opening between the jaws, the radial component of the distance between the two pivot points varies. As a consequence, the jaw which is connected to the handle at the outer or long radius pivot, hereinafter designated as the long jaw, approaches closer to the pipe axis than does the jaw connected to the handle at the inner or short radius pivot, hereinafter called the short jaw.

A principal object of this invention is to remove the foregoing limitations on the use of a tong of the type described above, and to provide a tong of this type which will properly grip pipe or joints of any size within a relatively wide range.

A further object is to provide a tong of the above type in which the pipe bores of the jaws define a true circle in any position of the handle.

A still further object is to provide a tong of the type in which the jaws have a double compensating fulcrum on the tong handle and in which the radial distance between the fulcrums is maintained constant.

In a preferred embodiment of the invention, the foregoing objects are attained by mounting the long jaw on a fixed pivot on the handle and slidably and pivotally mounting the short jaw on the handle, and by providing cooperating arcuate surfaces on the short jaw and handle whereby the two jaws are maintained in proper relation to the axis of the pipe opening irrespective of the position of the handle.

In a modification of the above, the desired relationship between the jaws is maintained by the provision of cooperating arcuate surfaces on the two jaws.

The manner in which the foregoing objects may be accomplished will be apparent from the following detailed description of a preferred embodiment and two modifications thereof, reference being had to the accompanying drawings wherein.

Figure 1:
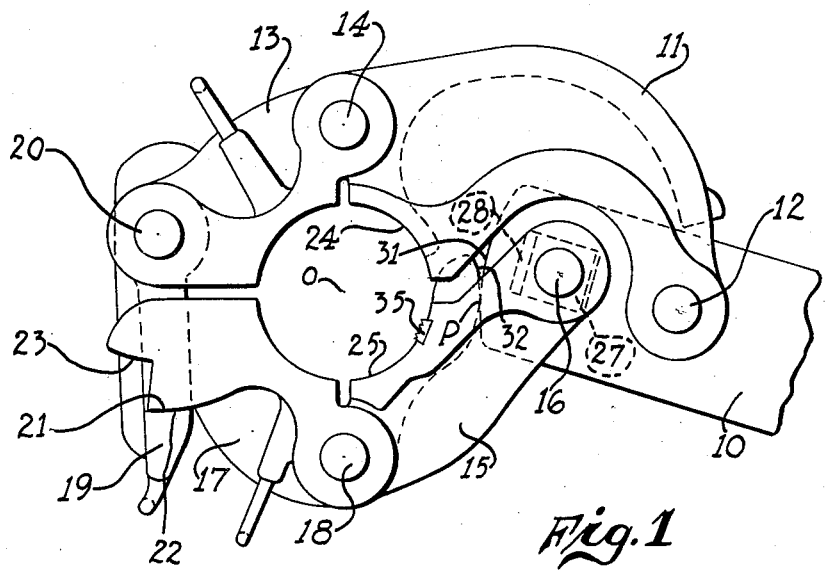
Fig. 1 is a plan view of a tong head embodying a preferred form of the invention.

Referring to Fig. 1, reference numeral 10 denotes the inner end of the usual tong handle through which torque is applied to the tong head. A long jaw 11 is pivotally mounted on the handle on a pivot pin 12, and has a latch jaw 13 pivotally mounted on its outer end on a pivot pin 14. A short jaw 15 is also pivotally mounted on the handle on a pivot pin 16, the axes of the pivot pins 12 and 16 preferably lying in a longitudinal plane of the handle altho not necessarily the central plane thereof. A latch lug jaw 17 is pivotally mounted on the outer end of the short jaw on a pivot pin 18. A latch 19 is pivotally mounted at 20 on the latch jaw 13, and is provided with an arcuate latching surface 21 adapted to engage either of two latching surfaces 22 and 23 on the latch lug jaw 17 to enable the tong to be applied to objects of widely differing diameters, such as drill pipe and drill pipe couplings. A double bore may be provided in the jaws in conjunction with the two-step latch, as described in U. S. Reissue Letters Patent No. 17,597 to Robert Adams, dated February 18, 1930.

It will be apparent that if the distance between the axes of the pivot pins 12 and 16 were constant, the radial component of this distance would vary as the handle 10 is swung relative to the tong head, and consequently the pipe bores 24 and 25 in the long jaw 11 and short jaw 15, respectively, would assume different relative distances from the theoretical center O of the pipe opening in the jaws and would not lie on a true circle except in one position of the handle.

To overcome this difficulty, one of the pivot pins, preferably the short jaw pivot pin 16, is slidably mounted in the handle. To this end, the pivot pin 16 is mounted in a block 27 slidably mounted in an elongated slot 28 in the handle. The length of the slot exceeds that of the block by an amount sufficient to permit the center distance between the pivot pins 12 and 16 to remain constant.

The provision of a slidable pivotal connection of one of the inner jaws with the handle will not, of itself, assure that the pipe bores of both inner jaws will contact the pipe properly. Accordingly, positive means are provided for this purpose. In the embodiment of Fig. 1 a radially inwardly directed arcuate surface 31 is formed on the inner end of the handle 10, concentric with the pivot pin 12. A cooperating arcuate surface 32 is likewise formed on the short jaw, concentric with the pipe opening in the jaw. Since the point of tangency of two tangent circles lies on a line extending between their centers, it is evident that the arcuate surface 31 always contacts the arcuate surface 32 at a point P lying on a line extending from the axis of the long jaw pivot 12 to the center O of the pipe opening in the jaws. It necessarily follows that as the handle 10 is swung in a clockwise direction to decrease the size of the pipe opening in the jaws, the bores 24 and 25 will remain equidistant from the center O since the bore 24 bears a fixed relation to the long jaw pivot 12 and the bore 25 is concentric with the arcuate surface 32 and the radial distance between the latter and the pivot 12 is maintained constant.

Figure 2:
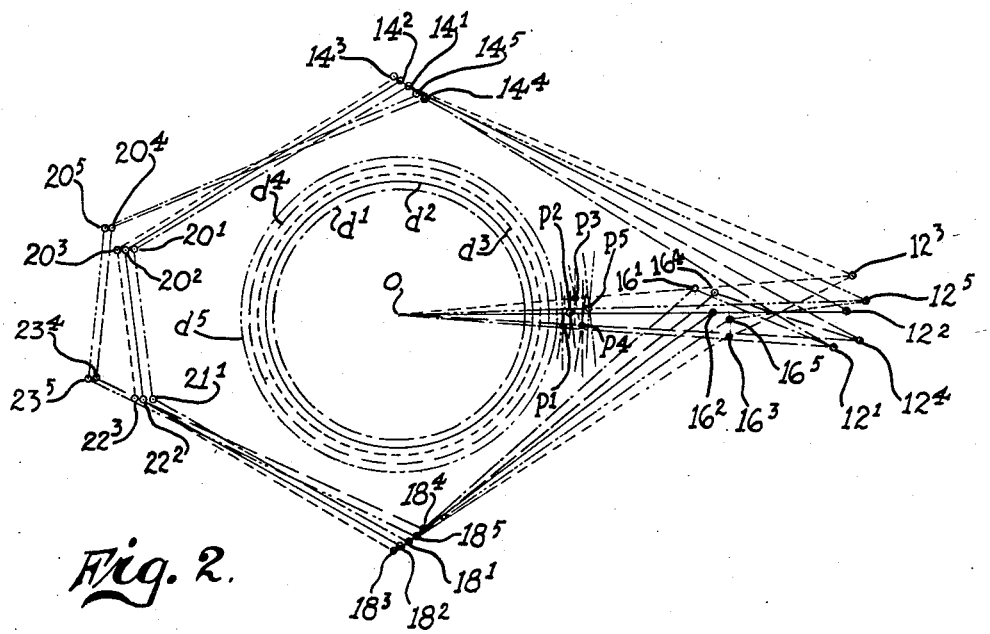
Fig. 2 illustrates diagrammatically the operation of the tong of Fig. 1.

Figure 2 illustrates diagrammatically various positions of the pivotal connections between the jaws and of the pivot pins 12 and 16 and the contact point P between the arcuate surfaces 31 and 32 as the tong is adjusted to grip pipe of different diameters. In this figure similar reference numerals are used to designate corresponding parts in Fig. 1 and are primed from 1 to 5 to indicate five successive positions for gripping pipe or joints having diameters ranging from $d^1$ to $d^5$. It should be noted that in positions 1 to 3 the first step 22 on the latch lug jaw 17 of Fig. 1 is engaged by the latch 19, whereas in positions 4 and 5 the second step 23 is engaged.

It will be observed that in contracting the jaws from position 3 to position 1, the distance between the long jaw pivot 12 and the short jaw pivot 16 decreases until the handle 10 reaches its central position, represented by position 2 in solid lines, and that thereafter this distance increases. It will also be observed that the successive contact points $P^1$ to $P^5$ between the arcuate surfaces 31 and 32 lie on lines between the pipe center O and the respective positions $12^1$ to $12^5$ of the long jaw pivot pin 12. As previously pointed out, this latter feature maintains a constant radial distance between the long jaw pivot 12 and the arcuate surface 32 on the short jaw, which in turn is responsible for maintaining the pipe bores 24 and 25 of these jaws equidistant from the center O.

Figure 3:
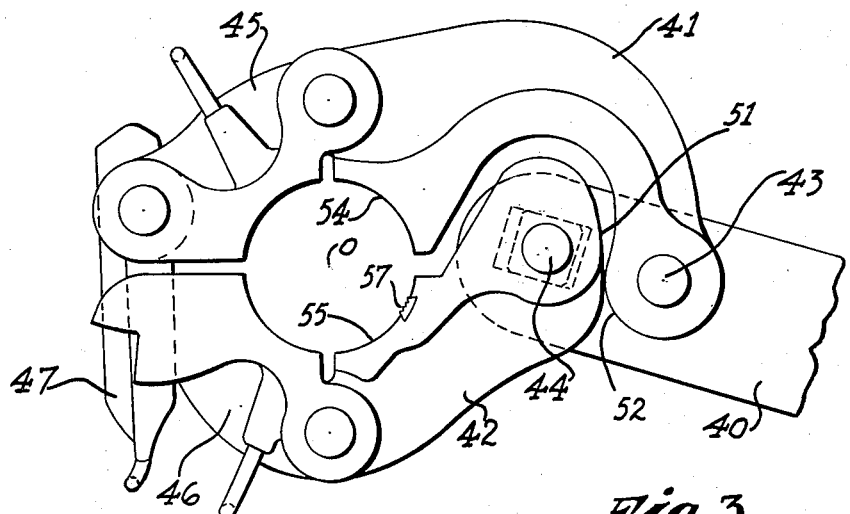
Fig. 3 is a view similar to Fig. 1 showing a modified form of the invention.

Referring now to Fig. 3, there is shown therein a tong head similar in most respects to that shown in Fig. 1 but embodying a modified arrangement for maintaining the pipe bores of the long and short jaws equidistant from the pipe center. As in Fig. 1, the tong comprises a handle 40 on which are pivotally mounted a long jaw 41 and a short jaw 42 on pivot pins 43 and 44 respectively. Outer jaws 45 and 46 are pivotally mounted on the jaws 41 and 42 and are latched about the pipe by a latch 47.

This form of the invention also resembles that shown in Fig. 1 in that the short jaw pivot 44 is mounted in a block 50 which is slidably mounted in an elongated slot in the handle to permit variation of the distance between the pivots 43 and 44. It differs from that previously described, however, in the provision of contacting arcuate surfaces on the long and short jaws instead of on the handle and the short jaw. An arcuate surface 51 is formed on the short jaw, having its center at O, and a cooperating arcuate surface 52 is formed on the long jaw concentric with the long jaw pivot 43.

It will be observed from a comparison of Figs. 1 and 3 that the arcuate surfaces 51 and of 52 of Fig. 3 have the same centers as the arcuate surfaces 32 and 31, respectively, of Fig. 1, and that consequently they function in a similar manner to accomplish the desired result. In Fig. 1 the proper interrelation between the long and short jaws is effected indirectly through an intermediate member—i. e., the handle, whereas in Fig. 3 it is accomplished by direct interconnection between the jaws. Since the arcuate surface 51 has its center at O and the contacting arcuate surface 52 is concentric with the long jaw pivot 43, the two arcuate surfaces 51 and 52 will always contact at a point lying on a straight line extending from the pivot 43 to the center O. Consequently the radial distance from the pivot 43 to the arcuate surface 51 will remain constant, and the pipe bores 54 and 55 will be maintained equidistant from the center O.

Figure 4:
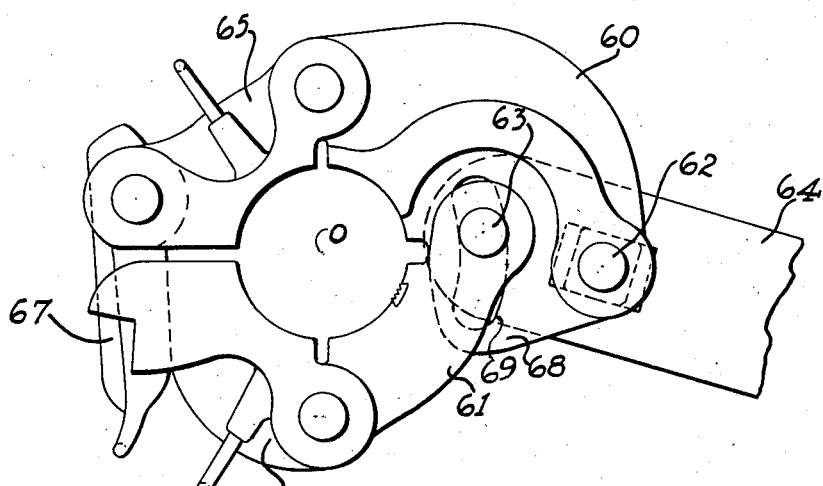
Fig. 4 is a plan view of a modification of the tong head of Fig. 3.

In Figure 4 is shown a slight modification of the form of the invention shown in Figure 3. In this form, as in Figure 3, cooperating arcuate surfaces are provided on the long jaw and the short jaw to maintain the desired interrelationship between these jaws. The principal distinction between the embodiments of Figs. 3 and 4 lies in the fact that in Fig. 3 the interengaging arcuate surfaces on the long and short jaws prevent the long jaw from moving inwardly relative to the short jaw but the short jaw is free to move inwardly relative to the long jaw, whereas in Fig. 4 a pair of oppositely directed surfaces on one jaw are confined between a pair of oppositely directed arcuate surfaces on the other jaw and hence relative radial movement between the jaws is positively prevented. The former arrangement, however, has certain advantages, as will be explained hereinafter.

The tong head of Fig. 4 comprises the long jaw 60 and the short jaw 61 pivotally mounted at 62 and 63, respectively, on the handle 64 and having outer jaws 65 and 66 mounted thereon and adapted to be latched together about a pipe by the latch 67. In this instance the long jaw pivot 62 is slidably mounted in the tong handle, differing in this respect from the form shown in Fig. 3. In this connection it should be noted that in the embodiments of Figs. 3 and 4 it is immaterial which of the inner jaw pivots is slidably mounted in the handle, since the latter is not interposed between the two jaws as an element of the equalizing mechanism as is the case in Fig. 1.

Referring once more to Fig. 4, it will be observed that a web 68 is provided on the long jaw 60, and an arcuate slot 69 extends transversely of the web and is engaged by the short jaw pivot pin 63. The arcuate surfaces of the slot lie on concentric circles having their center at O. There are thus provided a pair of oppositely directed arcuate surfaces on the long jaw concentric with the pipe opening, and between these faces there are a pair of oppositely directed arcuate surfaces on the short jaw pivot pin 63.

From the foregoing it will be apparent that the construction shown in Fig. 4 functions in the same manner to produce the same effect as the construction of Fig. 3. As the handle 64 is moved to different successive positions to contract or expand the jaws, the engagement of the pin 63 in the slot 69 maintains the two jaws equidistant from the center O.

It will be noted that in Figs. 1 and 3, wherein the long and short jaws are not constrained against relative movement in both radial directions, that the radially outwardly facing arcuate surface is formed on the short jaw rather than on the handle or on the long jaw. It would be entirely feasible, from the standpoint of maintaining the long and short jaws equidistant from the pipe bore, to reverse this arrangement. However, the reverse arrangement is less desirable from a practical standpoint because it would not afford equal pressure of all jaws against the pipe. Referring to Fig. 1, as the handle 10 is moved in a clockwise direction to contract the jaws about a pipe the long jaw 11 is in tension and is positively forced radially inwardly against the pipe because of the relative positions of its outer pivot 14, inner pivot 12 and the short jaw pivot 16 which functions as a fulcrum for the lever in swinging the long jaw about its outer pivot 14. In the case of the short jaw, however, the relative positions of its outer pivot 18, inner pivot 16, and fulcrum 12 are such that as the lever fulcrums about pivot pin 12 the short jaw is not forced radially inwardly toward the pipe axis to exert the same pressure as the long jaw. This is particularly true when the handle is swung to the lower side of its central position, as viewed in the drawings, in which position the best gripping effect is obtained. For the foregoing reasons, it is preferred to provide the short jaw with a radially outwardly directed arcuate surface which is engaged by an inwardly directed surface either on the long jaw or on the handle, whereby the short jaw is positively forced radially inwardly against the pipe.

As previously pointed out, in the embodiments of Figs. 1 and 3 the short jaw is free to move inwardly a short distance relative to the long jaw, causing the arcuate surfaces 31 and 32 of Fig. 1 and 51 and 52 of Fig. 3 to separate slightly. This is not a detriment but an advantage for the following reasons. It is customary to mount a tong die in the short jaw, as shown at 35 in Fig. 1 and at 57 in Fig. 3, and, if desired, a second die may be mounted in the long jaw although this is not considered necessary. Whether or not the arcuate surfaces become separated when applying the tong to a pipe depends entirely on the manner in which it is manipulated. If these surfaces are separated, however, manual swinging of the handle to contract the jaws will cause the outer of the two arcuate surfaces to strike the arcuate surface on the short jaw a light blow as they contact, thus giving the die an initial set in the pipe which aids in preventing slipping of the tong about the pipe prior to full contraction of the jaws into pressure engagement with the pipe.

Figure 5:
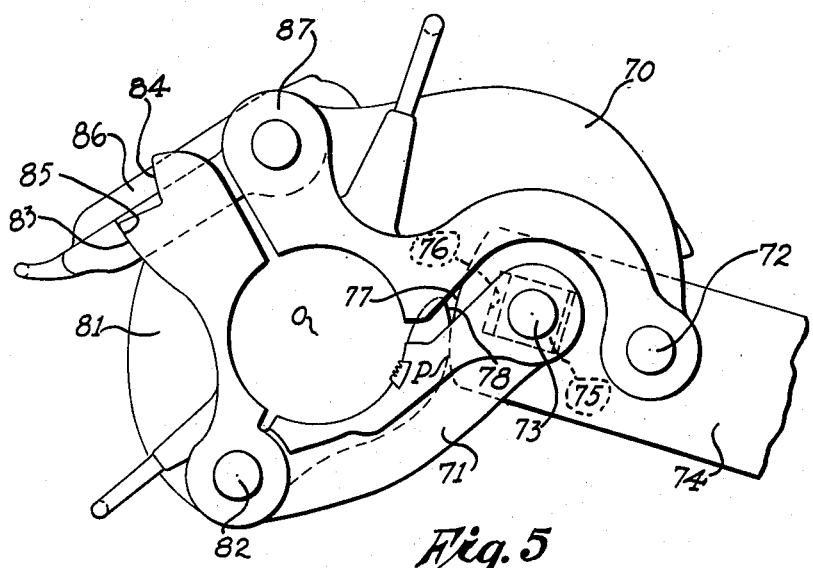
Fig. 5 shows a still further modification.

From the foregoing, it will be apparent that we have provided a highly improved tong adapted to grip various sizes of pipe with equal effectiveness, and have thereby removed a limitation on the use of a type of tong which has found particular favor with drilling crews because of its positive gripping action and because it distributes the pressure evenly around the pipe and thereby avoids crushing it. In the embodiments thus far described, several different constructions embodying the jaw equalizing principle have been set forth as applied to a four-jaw tong wherein the jaws are arranged in pairs pivotally mounted on the handle at their inner ends and having cooperating latch means at their outer ends for latching about a pipe. The principle is equally applicable to a three-jaw tong, however, an example of which is illustrated in Fig. 5.

In this figure, a long jaw 70 and a short jaw 71 are pivotally mounted at 72 and 73, respectively, on a handle 74. It will be observed that the short jaw pivot pin 73 is mounted in a block 75 which is slidable longitudinally of the handle in an elongated slot 76. It will also be observed that cooperating arcuate surfaces 77 and 78 are formed on the inner end of the handle and on the short jaw 71, respectively, the arcuate surface 77 being concentric with the long jaw pivot and the arcuate surface 78 having its center at O. A latch lug jaw 81 is pivotally mounted at 82 on the outer end of the short jaw 71, and has stepped latching surfaces 83 and 84 selectively engageable by a cooperating latching surface 85 on a latch 86.

Thus far this embodiment of the invention is similar in all respects to that illustrated in Fig. 1. The tong of Fig. 5 differs from that of Fig. 1 in that the latch 86 is pivotally mounted at 87 directly on the long jaw 70, the latch jaw 13 of Fig. 1 being omitted from this construction. It necessarily follows that with only three jaws the arcuate gripping surface of each jaw is of greater angular extent than in the four-jaw tong, and the pivotal connection 82 between the short jaw 71 and the latch lug jaw 81 is not diametrically opposite the latch pivot 87, as is the case with the corresponding pivots 14 and 18 of Fig. 1. This does not affect the operation of the equalizing mechanism, however, a fact which will be apparent from a consideration of Fig. 6, which illustrates diagrammatically the relationship between the various pivot points and the contact points on the arcuate surfaces 77 and 78 when the tong of Fig. 5 is adjusted to grip pipe of different diameters.

Figure 6:
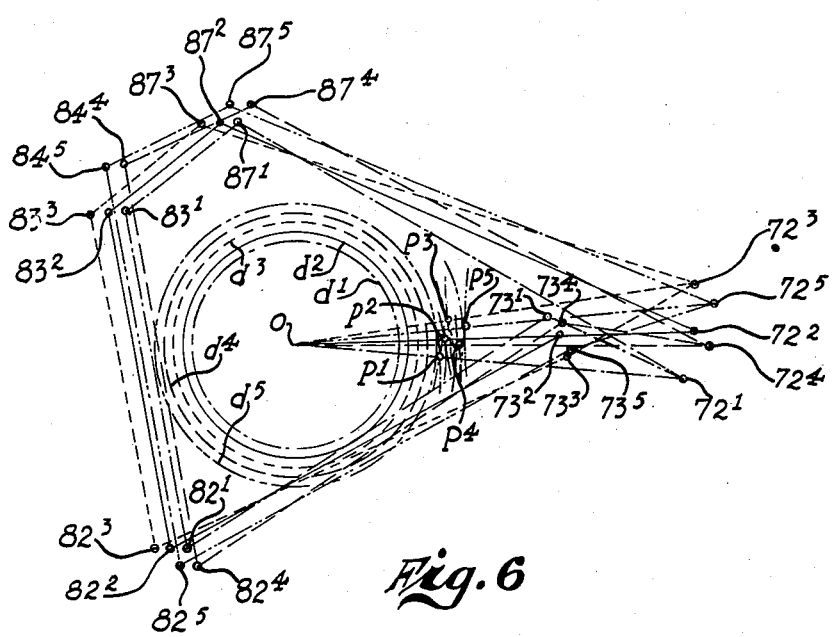
Fig. 6 illustrates diagrammatically the operation of the tong of Fig. 5.

It will be recalled with reference to Figs. 1 and 2 that as the tong handle 10 is moved into different angularly related positions that the point of contact P between the arcuate surfaces 31 and 32 always lies on a line between the long jaw pivot 12 and the pipe center O, thus maintaining the arcuate surface 32 on the short jaw 15, and consequently the pipe bore 25 therein, at a constant distance radially inwardly of the long jaw pivot. It will be apparent that the relative locations of the outer pivots 14 and 18 with respect to the center O have no bearing on the foregoing equalizing arrangement, and that the latter functions in a similar manner when the outer pivots of the long and short jaws are disposed a substantial distance on the opposite side of the pipe center O, as illustrated in Fig. 6. In this figure the same method of designation of the various pertinent points has been employed as was used in Fig. 2—i. e., the reference numerals used in Fig. 5 have been primed from 1 to 5 to designate successive positions of corresponding points as the jaws and handle are adjusted to grip pipe having diameters from $d^1$ to $d^5$.

For convenience in illustrating the application of the principle to a three-jaw tong, and particularly its application to such a tong embodying a two-step latch, the tong has been oriented about the pipe to maintain the range of swinging movement of the handle substantially symmetrical with respect to a horizontal line through the pipe center. It will be understood, of course, that in changing from the first latch step 83 to the second step 84 that the effective length of the latch lug jaw 81 is increased by the difference in the distances 82—83 and 82—84. In Fig. 6 this increase has been distributed equally on both sides of the aforementioned horizontal line, which accounts for the fact that points $82^4$ and $87^4$ are at substantially equal distances to the right of the last preceding corresponding points $82^3$ and $87^3$.

It is believed that the application of the equalizing principle to a three-jaw tong will be understood from the foregoing description and brief discussion of Fig. 6, and a detailed analysis of the movements of the pivot points is believed to be unnecessary. Suffice it to say that the cooperating arcuate surfaces on the short jaw and handle function in the same manner as in the four-jaw tong shown in Fig. 1, to maintain the pipe bores of the long and short jaws equidistant from the pipe axis.

Various other forms of equalizing means, including those shown in Figs. 3 and 4, are also equally adaptable to a three-jaw tong, and hence it is to be understood that the embodiment shown in Fig. 5 is solely for illustrative purposes. It will also be understood that inasmuch as the location of the outer pivots of the long and short jaws, and the number and character of the intervening linkage between the free ends of those jaws, have no effect on the operation of the equalizing means, the latter is applicable to a tong irrespective of the number of jaws therein.

The invention has particular utility in rotary tongs used principally in making up and breaking out tool joints in drill pipe. Such joints often become worn, due partly to contact with the well casing while drilling and partly to frequent making up and breaking out. A tong constructed in accordance with this invention will grip such worn joints as effectively as full diameter joints. The invention is not considered to be limited to its application to rotary tongs, however, but may be applied to tongs and wrenches generally to overcome the above-mentioned defect inherent in a tong of the type having a double fulcrum for the tong handle.

We claim:

1. A pipe tong comprising a handle, a first jaw pivotally connected to the handle, a second jaw connected to the handle for pivotal movement and movement longitudinally of the handle, other jaw means pivotally interconnecting said jaws and defining therewith a pipe opening, said handle having an arcuate surface thereon concentric with the axis of pivotal connection of said first jaw with the handle and said second jaw having a cooperating arcuate surface thereon substantially concentric with said pipe opening, said surfaces normally coacting to maintain the pipe bore of said second jaw at a substantially constant distance radially inwardly of said first jaw pivot, in all positions of said handle.

2. A pipe tong comprising a handle, a first jaw pivotally connected to said handle, a second jaw pivotally connected to and movable longitudinally of said handle, other jaw means pivotally interconnecting said jaws and defining therewith a pipe opening, said handle having an arcuate surface thereon concentric with the axis of pivotal connection of said first jaw with the handle, and said second jaw having a cooperating arcuate surface thereon substantially concentric with said pipe opening, said arcuate surfaces normally contacting each other to limit relative movement between said handle and second jaw radially of the pipe opening in a plurality of positions of swinging movement of said handle.

3. A pipe tong comprising a handle, a pair of opposed jaws connected to said handle, other jaw means pivotally interconnecting said pair of jaws and defining therewith a pipe opening, one of said jaws being connected to said handle on a pivot which is fixed relative to the handle and the other jaw being slidably and pivotally connected to the handle, and directly interengaging arcuate surfaces on said jaws for normally maintaining the pipe-engaging portions of the latter substantially equidistant from the center of said pipe opening in all positions of said handle.

4. A pipe tong as set forth in claim 3, in which said interconnecting means comprises a pin on one jaw and an arcuate slot in the other jaw, said slot being substantially concentric with said pipe opening.

5. A pipe tong as set forth in claim 3, in which said interconnecting means comprises an arcuate slot in the jaw having pivoted and slidable connection with the handle, said slot being substantially concentric with said pipe opening, and a pin on the other jaw, said pin being substantially concentric with said fixed pivot on the handle.

6. A pipe tong comprising a handle, a first jaw and a second jaw, one of said jaws being pivoted to said handle on a fixed pivot and the other jaw being slidably and pivotally connected to said handle, other jaw means pivotally interconnecting said jaws and defining therewith a pipe opening, and means normally maintaining the pipe-engaging portion of said first jaw at least as close to the center of said pipe opening as is the pipe-engaging portion of said second jaw, in all positions of said handle, said means comprising an arcuate surface formed on one jaw substantially concentric with said pipe opening, and a cooperating arcuate surface on the other jaw concentric with the pivotal connection of the latter with said handle.

7. A pipe tong as set forth in claim 6, in which said first named arcuate surface is formed on said first jaw, and said second arcuate surface comprises an extension of the pivot pin of said second jaw.

8. A pipe tong as set forth in claim 6, in which said first named arcuate surface is formed on said second jaw, and said second arcuate surface is formed on said first jaw.

9. In a pipe tong, a handle member, a series of interconnected pipe-encircling jaw means defining a pipe opening and including a pair of end jaw members pivotally connected to said handle member, the axis of pivotal connection to said handle member of one end jaw member being disposed at a greater distance from said pipe opening than the axis of pivotal connection between the other end jaw member and the handle member, whereby swinging of the handle constricts or loosens the jaw members about a pipe disposed in the pipe opening, means for preventing the pipe-engaging surface on said one end jaw member from approaching closer to the center of the pipe opening than the pipe-engaging surface on the other end jaw member during swinging of the handle member in tightening direction, said means comprising an arcuate surface on one of said members substantially concentric with the pipe opening and an opposed arcuate surface on another of said members concentric with the axis of pivotal connection of said last-named member with the third of said members, and the pivotal connection between one of said jaw members and the handle member being bodily movable relative to one of said members to permit said opposed arcuate surfaces to interengage in all positions of said handle member.

10. A pipe tong comprising a handle member, first and second jaw members each pivotally connected to said handle member, other jaw means pivotally interconnecting said jaw members and defining therewith a pipe opening, the axis of pivotal connection of said first jaw member with the handle member being located at a greater distance from the pipe opening than the axis of pivotal connection of the second jaw member with the handle member, cooperating means on said members for maintaining the pipe-engaging surface on said second jaw member at least as close to the center of the pipe opening as is the pipe-engaging surface on said first jaw member in all positions of said handle member, said means comprising an arcuate surface on one of said members substantially concentric with said pipe opening, an opposed arcuate surface on another of said members concentric with the axis of pivotal connection of said last-named member with the third of said members, and means freely movably mounting the pivotal connection between one of said jaw members and said handle member to permit said opposed arcuate surfaces to interengage in all positions of said handle member.

HERBERT E. GRAU.
CHESTER A. LUNDEEN.